(12) United States Patent
Risson

(10) Patent No.: US 6,947,591 B2
(45) Date of Patent: Sep. 20, 2005

(54) PROCESS OF IDENTIFYING THE SKY IN AN IMAGE AND AN IMAGE OBTAINED USING THIS PROCESS

(75) Inventor: Valery J. Risson, Paris (FR)

(73) Assignee: Eastman Kodak Company, Rochester, NY (US)

(*) Notice: Subject to any disclaimer, the term of this patent is extended or adjusted under 35 U.S.C. 154(b) by 571 days.

(21) Appl. No.: 10/184,693

(22) Filed: Jun. 28, 2002

(65) Prior Publication Data

US 2003/0012430 A1 Jan. 16, 2003

(30) Foreign Application Priority Data

Jul. 5, 2001 (FR) .............................. 01 08912

(51) Int. Cl.[7] .............................................. G06K 9/34
(52) U.S. Cl. .................... 382/164; 382/165; 382/167; 382/173; 358/538
(58) Field of Search ..................... 382/162, 164–172, 382/190, 260–270, 203, 199, 248, 224–228, 298–299, 305; 358/518–523, 538; 348/586; 345/597–618, 581, 634

(56) References Cited

U.S. PATENT DOCUMENTS

| | | | | |
|---|---|---|---|---|
| 6,415,282 B1 | * | 7/2002 | Mukherjea et al. ............ | 707/3 |
| 6,512,846 B1 | * | 1/2003 | Luo ........................... | 382/165 |
| 6,661,907 B2 | * | 12/2003 | Ho et al. ..................... | 382/118 |
| 2003/0053685 A1 | * | 3/2003 | Lestideau .................... | 382/164 |
| 2004/0012601 A1 | * | 1/2004 | Sang et al. .................. | 345/581 |
| 2004/0223662 A1 | * | 11/2004 | Urano et al. ................. | 382/299 |

FOREIGN PATENT DOCUMENTS

| | | |
|---|---|---|
| EP | 0 913 793 A2 | 10/1998 |
| EP | 1 107 179 A2 | 11/2000 |
| EP | 1 107 182 A2 | 11/2000 |

* cited by examiner

Primary Examiner—Kanjibhai Patel
Assistant Examiner—Ali Bayat
(74) Attorney, Agent, or Firm—David A. Novais

(57) ABSTRACT

The invention relates to a process of identification of sky in a digital image made up of a set of points that can be located in the plane of the image. Each point of an image being associated with a color and a brightness. According to the invention process the image is filtered and the filtered image is then segmented into several portions. A mosaic image is then produced for which a color is associated with each portion. Portions having at least one point on the image edges are then selected and identified as sky. The portions have colors varying within a color range containing at least blue colors.

24 Claims, 4 Drawing Sheets

PROCESS OF IDENTIFYING THE SKY IN AN IMAGE AND AN IMAGE OBTAINED USING THIS PROCESS

This is a U.S. original application which claims priority on French patent application No. 0108912 filed Jul. 5, 2001.

FIELD OF THE INVENTION

The invention relates to the technical field of processing digital or digitized images. More specifically, the invention relates to a process that enables sky zones to be identified in an image.

BACKGROUND OF THE INVENTION

The detection of the sky in an image enables easier understanding of the image content with a view to performing later digital processing.

Thanks to the development of data processing, especially digital processing tools, methods have been developed to index each pixel of an image, according to a color criterion, in order to identify certain categories of objects in the image, such as the skin, grass or sky. The first techniques used are generally statistical methods based on pixel by pixel color analysis. In this spirit, a more elaborated technique has been developed, using color spectral analysis, based on histograms of shades from which the brightness and saturation components have been removed. However, this sophistication only provides a limited improvement, due to the purely statistical approach and use of a single color criterion.

Another approach has developed in parallel, which includes image structural analysis, for which segmentation into several zones is performed based on color criteria. Compared with purely statistical techniques, this approach provides an improvement, due to the structural analysis of the image. Nevertheless, it remains limited because it is only based on color criteria. The development towards more sophisticated techniques, based on several criteria, such as color and texture, have enabled significant improvements. However, the processing quality usually remains linked to the presence, in the processed image, of an object used as color reference. The semantic classes into which it is planned to classify objects are difficult to reduce to a set of low level characteristics. Thus this approach remains inaccurate despite the multiplication of criteria. The most recent techniques integrate the use of physical models, which enables more accurate distinction among the various objects of an image, and especially, in the identification of sky zones.

Patent Application EP 1,107,179 describes a method to detect regions of sky in an image, based on a prior classification of the image pixels according to a color criterion, its segmentation and sky identification by physical criteria.

The method described enables the sky to be differentiated from objects having the same color and texture as it.

However, this method only enables the detection of regions having a uniform blue color, which excludes the detection of a cloudy sky.

It is an object of the invention to provide a process that enables the identification of a blue, cloudy or overcast sky in a color image.

SUMMARY OF THE INVENTION

The invention comprises a process of sky identification in an image bounded by edges and comprising a set of image points that can be located in the plane of the image, with each image point being associated with a color and brightness. The color is defined by chromatic components that can be located in a color space. The brightness is determinable from the chromatic components. This process is characterized in that it comprises the following steps:

the image is filtered;

the filtered image is then segmented into several portions, so that each portion corresponds to a set of connected image points having a substantially uniform color;

from the image segmented in the previous step, a mosaic image is then produced for which a color is associated with each portion, with the color being representative of the portion; and portions having at least one point on the image edges are then selected, and portions having colors varying within a color range containing blue colors are identified as sky.

The invention also relates to images produced using digital processing between a starting image and a mapping or mask of this starting image, with the mapping or mask having been obtained by the process previously presented.

Various other characteristics emerge from the description made below which sometimes refer to the annexed drawings illustrating, as non-limiting examples, the digital methods used.

DETAILED DESCRIPTION OF THE INVENTION

The identification of the sky in question can, in general, be understood as being the recognition of the presence or not of the sky on each point of the image. This recognition can be accompanied by a point by point encoding of the image, giving information of the presence or not of sky. This encoding is useful for producing a mapping of the sky of the image, as well as producing a mask of the zones of sky or zones without sky.

The image from which the sky identification is produced can be a digital photograph 70 (FIG. 7), or an image digitized from a photograph. The photographed view can comprise sky zones 71 that can have a variety of characteristics. The sky can be listed in one of the four following categories:

blue sky, i.e. sky with no clouds;

overcast sky, with no part of the blue sky visible;

cloudy sky, comprising a mixture of blue sky and clouds; and evening sky, comprising shades of yellow, orange or red.

Identification of sky, according to the invention, more especially concerns skies belonging to the first three categories.

The image to be processed by the process according to the invention comprises a set of points that can be defined by the resolution of the camera or that of the scanner that was used. Most often the image points are the pixels defined by the digital image or digitized image 70.

The image points can also be pixel groups representing the image with a lower resolution, which enables faster digital processing. In such a case, it can be useful to carry out preliminary processing in order to determine the average color of each of these points.

The image points must also be locatable in its plane, which enables indexing to be carried out for later digital processing. Most often, these points are locatable using their coordinates in a system made up by two axes parallel to the image plane, and preferably orthogonal.

Figure 1:
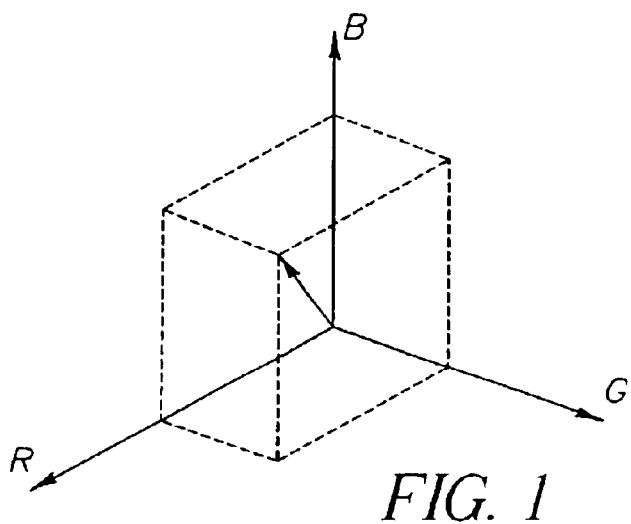
FIG. 1 is a graphic representation in space, of the color of a point according to its chromatic components, in a color space coordinate system having three axes corresponding to the primary colors;.

According to the present invention, each point of an image is associated with a color defined by the chromatic components R, G, B that can be located in the RGB color space of an acquisition system. The R, G, B chromatic components of a color are generally the relative weight of each of the three primary colors making up the color. As shown in FIG. 1, the color of a point can be represented by a vector, having for an application point the origin of the three axes corresponding to the primary colors, and for an end, a point located by the R, G, B chromatic components of the color on these three axes.

There are several types of RGB color space that vary according to the acquisition system used. They are differentiated from each other by the wavelengths of their associated primary colors as well as by the reference white. These color spaces are also called "physical color spaces". Standards have been defined, such as the CIE (Commission Internationale de l'Eclairage) for which the primary colors have wavelengths of 700 nm, 546.1 nm and 435.8 nm.

According to the invention, each point of an image is associated with a brightness. The brightness of a point can generally be determined from the chromatic components of the color of the point. Preferably, the brightness of a point is determined by a component Y in an XYZ color space system, the color of the point having X, Y, Z components in the system. The brightness of a point can be determined using a linear combination of the chromatic components R, G, B of the color of the point.

The relevant XYZ color space is preferably defined independently of the material characteristics related to the acquisition system's physical constraints. This XYZ color space can be, especially, a standardized color space, e.g. defined according to the CIE standard or others known by the name "Recommendation 601", "Recommendation 709", etc.

The XYZ color space is generally defined by a transfer matrix that enables going from the RGB color space to the XYZ color space, as well as by a matrix enabling a transfer in the other direction.

In the case of the CIE standard, the transfer matrices of a physical RGB color space to a standardized XYZ color space, in both directions, can be expressed as follows:

$$\begin{pmatrix} X \\ Y \\ Z \end{pmatrix} = \begin{pmatrix} 0.49 & 0.31 & 0.2 \\ 0.1769 & 0.8124 & 0.01063 \\ 0 & 0.01 & 0.99 \end{pmatrix} * \begin{pmatrix} R \\ G \\ B \end{pmatrix}$$

$$\begin{pmatrix} R \\ G \\ B \end{pmatrix} = \begin{pmatrix} 2.3647 & -0.896 & -0.468 \\ -0.5151 & 1.426 & 0.0887 \\ 0.005 & -0.0144 & 1.009 \end{pmatrix} * \begin{pmatrix} X \\ Y \\ Z \end{pmatrix}$$

In this special case, the brightness can be expressed as follows:

$$V=0.176*R+0.81*G+0.01*B$$

The three-dimensional system of the standardized XYZ color space can also be orthogonal, i.e. the three axes locating the X, Y, Z components are orthogonal.

Figure 2:
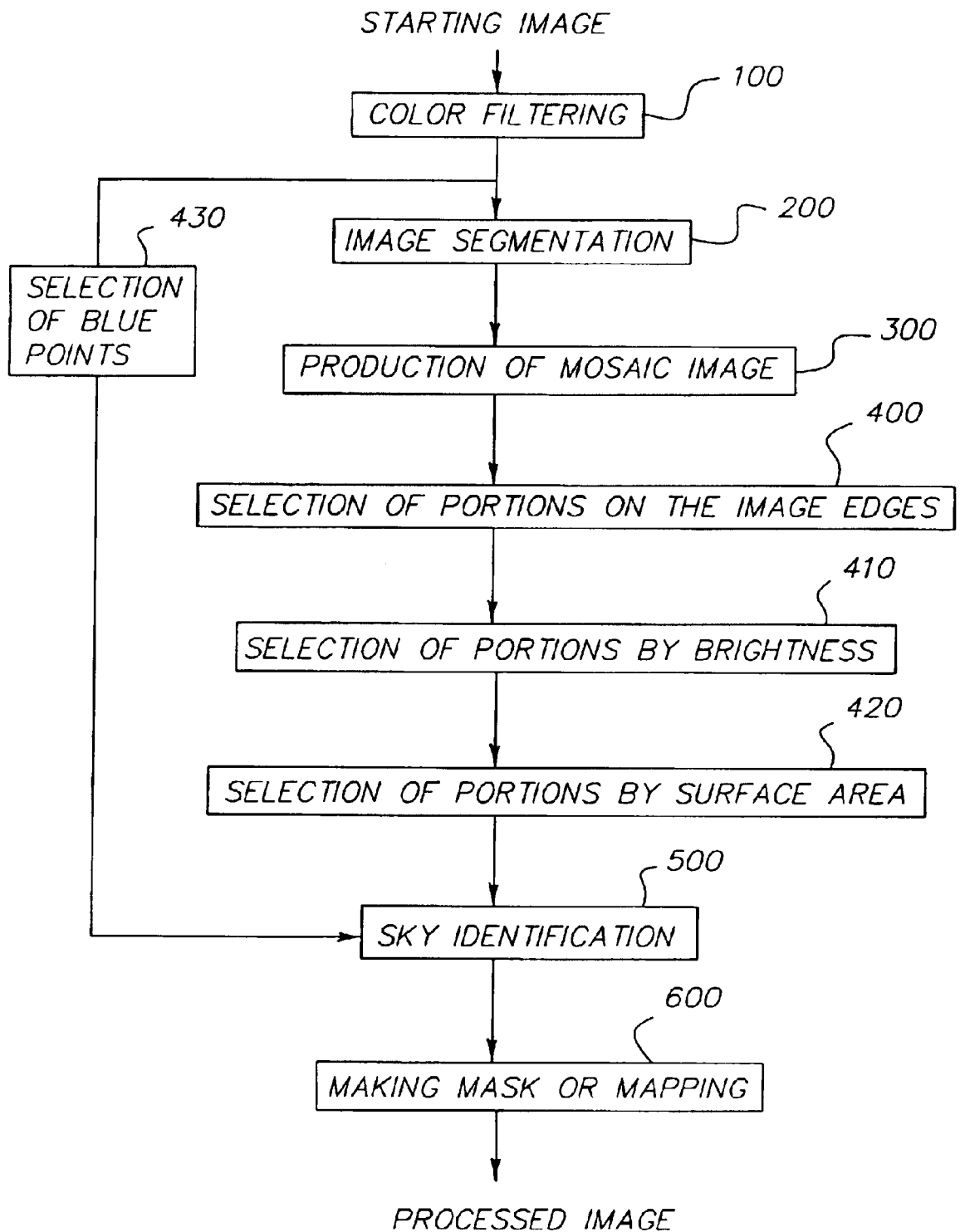
FIG. 2 illustrates the various steps of the process of the invention.

As shown in FIG. 2, the invention process comprises at least seven steps that are implemented from an image such as described above.

In compliance with a first step 100 of the invention, the image 70 is filtered. This filtering can furthermore enable image noise to be removed. It can be carried out by a method which includes replacing, at each image point, the color by that of a point near the relevant point, which makes the color of the nearby points more uniform. Another way of describing the filtering according to the invention is to replace the color of each image point by the color of a point near the relevant point, whose color most closely matches the center of gravity of the cloud of points formed by the nearby points in the color space.

In compliance with a second step 200 of the invention process, the filtered image is segmented into several portions, so that each portion is a set of connected image points having a substantially uniform color. The term substantially uniform color refers to a color that can be shaded by a segmentation tool applied to the topology of the gradient calculated in a uniform color space. Generally, the portions of the image obtained from this step of the process are a set of connected points having a substantially uniform texture. The texture of an image portion is generally linked to the variation of the color gradient at every point of the portion. Large size portions are often less textured than small ones.

Further, each image portion is generally made up by a set of points that are contiguous.

The implementation of a segmentation step at an advanced stage of the process prevents increasing any faults of the image pixels during later processing steps. Indeed, these faults can be generated during the digital acquisition of the image and can, in some cases, persist despite a prior filtering step.

According to a preferential embodiment of the invention, image segmentation comprises the following steps:

the L*, a*, b* components of the gray levels of each image point, expressed in a uniform color space, are determined from the chromatic components of the point's color;

a gray level gradient is then calculated at every image point, the gray level gradient at a given point being obtained from the L*, a*, b* components of the point and those of nearby points, which leads to a topographic map of the gray level gradient of the image; and the image is then segmented into several portions from the topographic map of the gray level gradient determined at the previous step.

According to an advantageous embodiment, the determination of the L*, a*, b* components of the gray levels of each image point can, especially, comprise the following steps:

the X, Y, Z components of the color are determined in a three-dimensional system defined in the XYZ color space;

the parameters Xn, Yn, Zn are calculated, whose values are the tristimulus of the light source; and the L*, a*, b* components of the gray levels of each image point are determined using the following formulas:

$$L^* = 166 * f\left(\frac{Y}{Yn}\right) - 16$$

$$a^* = 500 * \left[f\left(\frac{X}{Xn}\right) - f\left(\frac{Y}{Yn}\right)\right]$$

$$b^* = 200 * \left[f\left(\frac{Y}{Yn}\right) - f\left(\frac{Z}{Zn}\right)\right]$$

with: $f(x) = x^{\frac{1}{3}}$, if $x > 0.008856$ and: $f(x) = 7.787 * x + \frac{16}{116}$, if $x \leq 0.008856$ Preferably, the X, Y, Z components of the color are determined in a standardized XYZ color space, using the R, G, B chromatic components of said color, with the standardized XYZ color space being defined independently of the material characteristics related to the acquisition system's physical constraints.

According to a particular embodiment, the gradient of the gray level at a given point can be calculated as follows:

for each point nearby the given point, having components $L^*_j$, $a^*_j$, $b^*_j$ in the uniform color space, the differences $\Delta L^*_j$, $\Delta a^*_j$, $\Delta b^*_j$ of the components between the given point and each nearby point are calculated as follows:

$\Delta L^*_j = |L^* - L^*_j|$ $\Delta a^*_j = |a^* - a^*_j|$ $\Delta b^*_j = |b^* - b^*_j|$ the gray level differences $\Delta E_j$, in the uniform color space, between the given point and each nearby point are calculated as follows:

$\Delta E_j = [(\Delta L^*_j)^2 + (\Delta a^*_j)^2 + (\Delta b^*_j)^2]^{1/2}$; and the gray level gradient at the given point is the maximum of the gray level differences $\Delta E_j$ calculated in the previous step.

Figure 3:
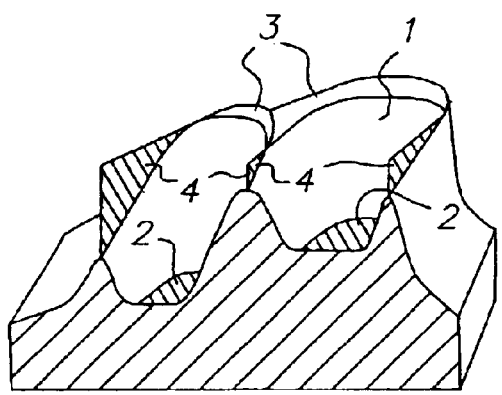
FIG. 3 illustrates a method of digital segmentation of an image for an image of gray levels.

According to a preferred embodiment of the invention, the image can be segmented into several portions using a digital-image segmentation tool known by the name watershed transform. As shown in FIG. 3, this tool can be illustrated as a process to simulate the flooding of the topographic surface of a function corresponding to a gray level gradient of the image. This function can be shown in the space by a series of holding basins 1 and the minimums of the function by the bottom 2 of each of the basins. These holding basins 1 are effectively regions of the image whose gray level is not very contrasted, i.e. to sets of image points having a substantially uniform color. To produce the image segmentation, it is contemplated to simulate, using an algorithm, flooding whose sources would be located in the bottom 2 of each holding basin 1. During the water rise, whose level 3 is assumed to be uniform at every point of the topographic surface, the basins fill up to overflowing. To prevent the mixing of water coming from different sources, the algorithm constructs dams 4 at every point of the overflow, and insofar as the water level 3 rises. When the water level 3 reaches the highest point of the topographic surface, the network of dams 4 constructed by the algorithm constitutes the limits of the portions of the segmented image, in which the points have a substantially uniform color.

In compliance with step 300 (FIG. 2) of the invention process, based on the segmented image, a mosaic image 80 (FIG. 8) is made so that the color associated with each portion is representative of the portion.

Figure 4:
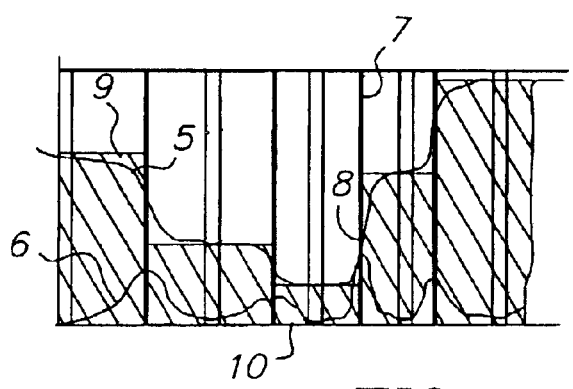
FIG. 4 illustrates a method of producing a mosaic image.

According to a preferred embodiment shown in FIG. 4 the mosaic image 80 can be made so that the color associated with each portion is the color of the point of the portion having a minimum gray level gradient. FIG. 4 represents, according to a given axis of the image, profiles of the gray level 5 and of the gradient 6 of the gray level 5 as well as the limits 7 of each portion defined by the local maximums 8 of the gradient 6 of the gray level 5. The color 9 associated with each portion is the color corresponding to the minimum 10 of the gradient 6 of the gray level 5.

In compliance with a fourth step 400 (FIG. 2) of the invention process, portions having at least one point on the image edges are selected.

According to a preferred embodiment, portions having at least one point on the image edges are selected by geodesic reconstruction of the mosaic image points connected to the edges under a mask corresponding to the mosaic image.

Figure 6:
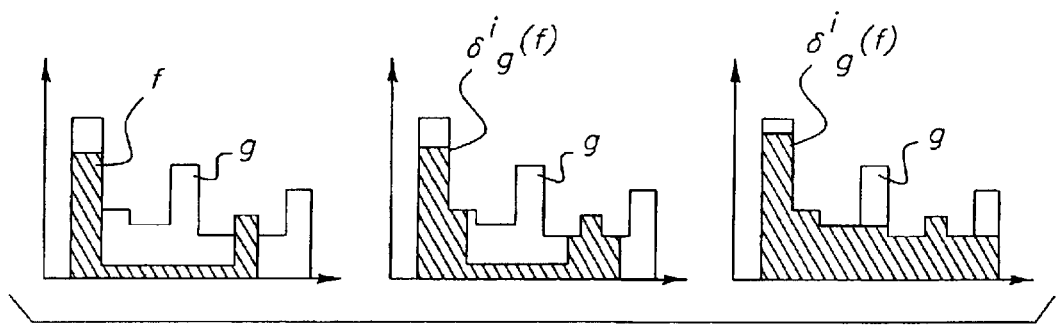
FIG. 6 represents a geodesic construction by the dilatation of function f under a mask defined by function g.

A geodesic reconstruction $R_g(f)$ is carried out using two images, one image of markers defined by a function f and one mask image defined by a function g, to produce an image resulting from the reconstruction of the markers under the mask. The geodesic reconstruction $R_g(f)$ by expansion of the function f under the mask g, can be expressed as follows:

$R_g(f) = \delta^i_g(f)$, where i is such that $\delta^i_g(f) = \delta^{i+1}_g(f)$ As shown in FIG. 6, the markers are expanded using a plane-structuring element until $\delta^i_g(f) = f$, $\delta^i_g$ being an expansion function of the function f. The reconstruction includes expanding the markers defined by the function f until idempotency, by ensuring that it is always less than or equal to the function g of the mask image. Thus the principle includes constraining expansion of the markers by the function g of the mask image.

According to this preferred embodiment, where one seeks to select the portions having at least one point on the image edges, points that are connected to the image edges are used as markers. The mask image is the mosaic image, for which the limits of the portions of the segmented image are shown. These limits thus prevent the reconstruction of the image portions that are not connected to the edges.

According to a preferred embodiment of the invention process, between step 400 and step 500 defined below, portions having a color whose brightness is more than a brightness limit are selected: step 410. The brightness limit can be defined in relation to the average image brightness. The average brightness of an image can be defined as being the average of the brightness at each image point.

Preferably, the brightness limit is between a quarter and three-quarters of the average image brightness, in particular it is half the average image brightness.

According to another preferred embodiment of the invention process, between step 400 and step 500 defined below, portions having an area more than an area limit are selected: step 420. The area limit can be defined in relation to the area of the image.

Preferably, the area limit is between 1% and 4%, in particular it is 2.5%, of the total image area.

In compliance with a fifth step 500 of the invention process, portions having a color varying within a color range containing at least blue colors are identified as sky.

The range containing at least blue colors can be defined as going from white to saturated blues, passing through all shades of blue.

Figure 5:
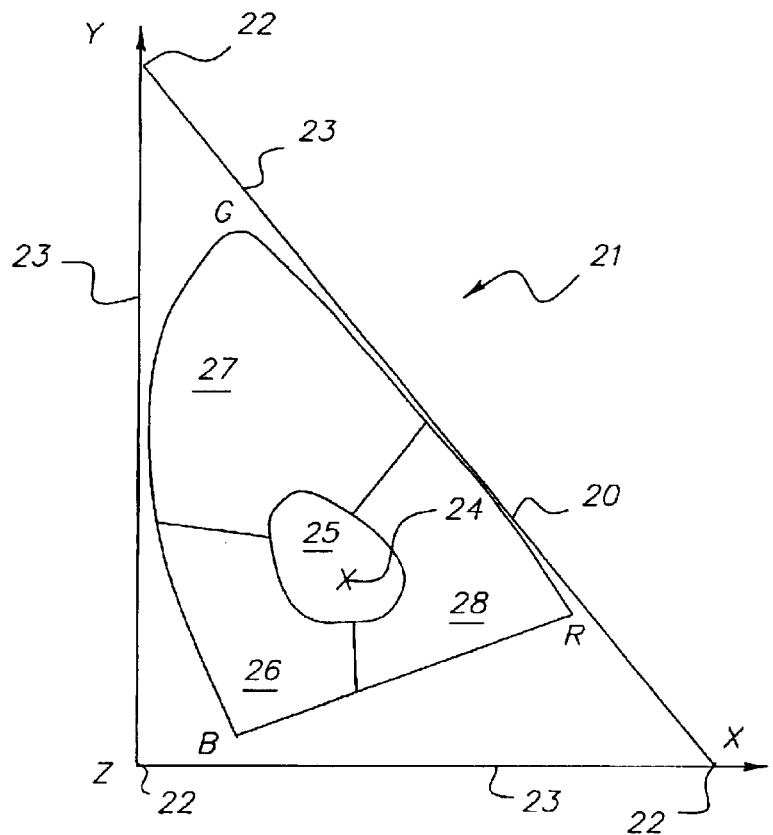
FIG. 5 illustrates a surface onto which are projected the color shades located by the chromatic coordinates x and y.

This identification can be made using the chromatic coordinates x, y of the color in the chromatic plane of the color space defined above. As shown in FIG. 5, the color of a point, or an image portion, can be represented by a point of the colored surface 20 in the plane 21 where the chromatic coordinates x, y are located. The colored surface 20 has a shape close to that of a triangle defined by three ends 22, each of them being assigned to a primary color. In this representation, these ends are linked by a contour line 23 corresponding to the shades of saturated colors between the two primary colors. The color shades in the colored surface 20 lighten towards the center of the triangle, until a completely white color is obtained at the central point of the triangle defined as being the reference white 24. The colored surface 20 can be arbitrarily divided into several zones corresponding to various shades of colors, such as a light zone 25, around the reference white, a blue shades zone 26, a green shades zone 27 and a red shades zone 28.

The three-dimensional location of the color space will advantageously be chosen so that the chromatic coordinates x, y of a color varying within a range containing at least blue colors, be approximately equal to or less than the maximum values of the chromatic coordinates of a color located in the light zone of the colored surface.

According to a preferred embodiment of the invention, a color varying within a range containing blue colors can be located by chromatic coordinates x, y of the two-dimensional system of the chromatic plane, respectively less than the chromatic coordinates of a light color, preferably to the components Xw, Yw of a reference white in the chromatic plane.

According to a preferred embodiment of the invention, portions having a color varying within a color range containing blue colors are identified as sky using a geodesic reconstruction in the image plane. The mask image used can be the image obtained following step 400 of the invention process, or preferably, a filtered image, e.g. such as that obtained in step 100.

According to an embodiment of the invention, the process includes a sixth step 600 during which the sky is mapped or a mask of the sky zones or zones without sky in the image is made, from the identification of the presence of sky in the image.

Figure 7:
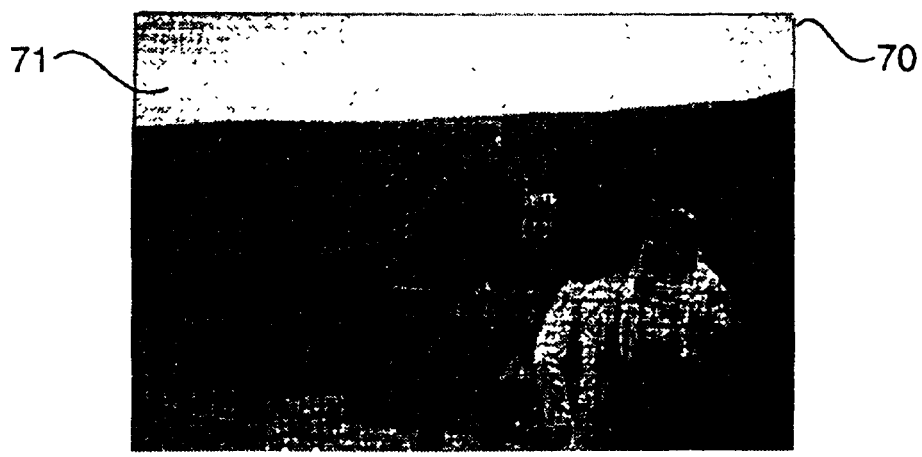
FIG. 7 represents a digital photograph that can be used as the starting image of the process of the invention.
Figure 8:
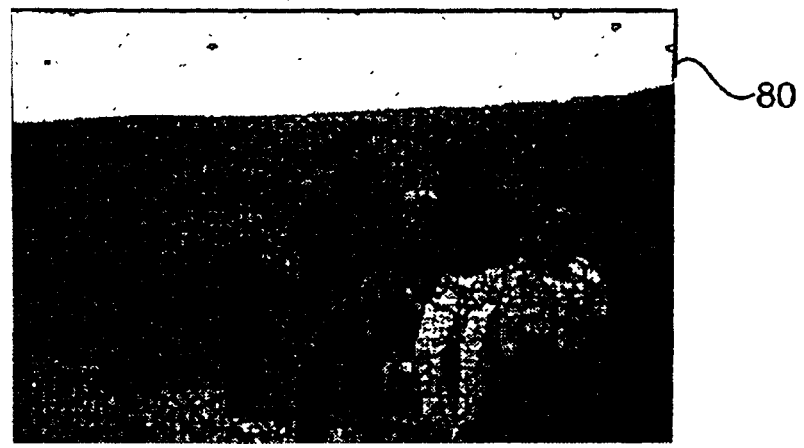
FIG. 8 represents a mosaic image obtained from the digital photograph of FIG. 7.
Figure 9:
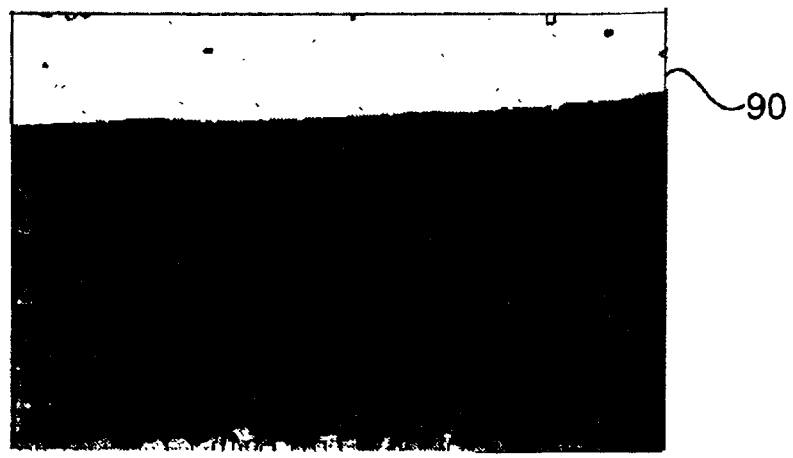
FIG. 9 represents a mask showing the sky zones, obtained by the process of the invention from the digital image of FIG. 7.

Processing of the image according to the invention process can enable, using a digital color photograph 70, as shown (in black and white) in FIG. 7, an intermediate mosaic image 80 to be obtained, as shown in FIG. 8, as well as a mask 90 of the zones without sky, as shown in FIG. 9.

According to another aspect, the invention relates to an image produced using digital processing between a starting image and a mapping or mask of this starting image, the mapping or mask having been obtained by the process previously presented.

Using the starting image 70 shown in FIG. 7 and the mask 90 associated with it, shown in FIG. 9, it is possible to make other images by digital processing, e.g. by attenuating more or less the clarity of the sky on the starting image.

The invention has been described in detail with particular reference to certain preferred embodiments thereof, but it will be understood that variations and modifications can be effected within the spirit and scope of the invention.

What is claimed is:

1. A process of identifying a sky in a digital image, the digital image being bounded by edges and comprising a set of image points that are locatable in a plane of said image, each image point being associated with a color and brightness, the color being defined by chromatic components that are locatable in a color space, the brightness being determinable from said chromatic components, wherein the process comprises the steps of:

filtering the image;

segmenting the filtered image into several portions, so that each portion corresponds to a set of connected image points having a substantially uniform color;

producing a mosaic image from the segmented image for which a color is associated with each portion, said color being representative of said portion;

selecting portions having at least one point on the image edges; and identifying portions having colors varying within a color range containing blue colors as sky.

2. A process according to claim 1, wherein the brightness of a point is determined by a component Y in an XYZ color space system, the color of said point having X, Y, Z components in the system.

3. A process according to claim 2, wherein the XYZ color space is defined independently of material characteristics related to physical constraints of an acquisition system.

4. A process according to claim 3, wherein the XYZ color space is a standardized color space.

5. A process according to claim 1, wherein the image is filtered by a method which comprises replacing, at each image point, the color by that of a point near a relevant point, which makes the color of nearby points more uniform.

6. A process according to claim 1, wherein the image segmentation step comprises the steps of:

determining L*, a*, b* components of gray levels of each image point, expressed in a uniform color space, from the chromatic components of said point's color;

calculating a gray level gradient at every image point, the gray level gradient at a given point being obtained from the L*, a*, b* components of said point and those of nearby points, which leads to a topographic map of the gray level gradient of the image; and segmenting the image into several portions from the topographic map of the gray level gradient determined at said calculating step.

7. A process according to claim 6, wherein the determination of the L*, a*, b* components of the gray levels of each image point comprises the steps of:

determining the X, Y, Z components of the color in a three-dimensional system defined in the XYZ color space;

calculating parameters Xn, Yn, Zn, whose values are a tristimulus of a light source; and determining the L*, a*, b* components of the gray levels of each image point using the following formulas:

$$L^* = 166 * f\left(\frac{Y}{Yn}\right) - 16$$

$$a^* = 500 * \left[f\left(\frac{X}{Xn}\right) - f\left(\frac{Y}{Yn}\right)\right]$$

-continued $$b^* = 200 * \left[ f\left(\frac{Y}{Yn}\right) - f\left(\frac{Z}{Zn}\right) \right]$$

with: $f(x) = x^{\frac{1}{3}}$, if $x > 0.008856$ and: $f(x) = 7.787 * x + \frac{16}{116}$, if $x \leq 0.008856$.

8. A process according to claim 6, wherein the gradient of the gray level at a given point is calculated as follows:

for each point nearby the given point, having components L*j, a*$_j$, b*$_j$ in the uniform color space, differences ΔL*$_j$, Δa*$_j$, Δb*j of said components between the given point and each nearby point are calculated as follows:

$\Delta L^*_j = |L^* - L^*_j|$ $\Delta a^*_j = |a^* - a^*_j|$ $\Delta b^*_j = |b^* - b^*_j|$ the gray level differences ΔE$_j$, in the uniform color space, between the given point and each nearby point are calculated as follows:

$$\Delta E j = [(\Delta L^*_j)^2 + (\Delta a^*_j)^2 + (\Delta b^*_j)^2]^{\frac{1}{2}}; \text{ and}$$

the gray level gradient at the given point is the maximum of the gray level differences ΔE$_j$ calculated in the previous step.

9. A process according to claim 6, wherein the image is segmented into several portions using a digital-image segmentation tool.

10. A process according to claim 9, wherein said digital-image segmentation tool is a watershed transform.

11. A process according to claim 1, wherein the mosaic image is made so that the color associated with each portion is the color of the point of said portion having a minimum gray level gradient.

12. A process according to claim 1, wherein the portions having at least one point on the image edges are selected by geodesic reconstruction of the mosaic image points connected to the edges under a mask corresponding to the mosaic image.

13. A process according to claim 1, comprising the further step of selecting portions having a color whose brightness is more than a brightness limit, between said step of selecting portions having at least one point on the image edges and said step of identifying portions having colors varying within a color range containing blue color.

14. A process according to claim 13, wherein the brightness limit is between a quarter and three-quarters of the average image brightness.

15. A process according to claim 14, wherein the brightness limit is half the average image brightness.

16. A process according to claim 1, comprising the further step of selecting portions having an area more than an area limit, between said step of selecting portions having at least one point on the image edges and said step of identifying portions having colors varying within a color range containing blue color.

17. A process according to claim 16, wherein the area limit is between 1% and 4% of the total image area.

18. A process according to claim 17, wherein the area limit is 2.5% of the total image area.

19. A process according to claim 1, wherein a color varying within a range containing blue colors can be located by chromatic coordinates x, y of a two-dimensional system of the chromatic plane, respectively less than chromatic coordinates of a light color, to components Xw, Yw of a reference white in the chromatic plane.

20. A process according to claim 19, wherein portions having a color varying within a color range containing at least blue colors are identified as sky using a geodesic reconstruction in the image plane.

21. A process according to claim 1, wherein a mapping of the sky in the image is made from the identification of the presence of sky in the image.

22. An image produced using digital processing between a starting image and a mapping or mask of the starting image, the mapping or mask being obtained by the process according to claim 21.

23. A process according to claim 1, wherein a mask of sky zones or zones without sky in the image is made based on the identification of the presence of sky in the image.

24. An image produced using digital processing between a starting image and a mapping or mask of the starting image, the mapping or mask being obtained by the process according to claim 23.

* * * * *